June 11, 1940. J. SAY 2,204,030

TWIST DRILL AND LIKE METAL-CUTTING TOOLS

Filed July 22, 1937

James Say

Patented June 11, 1940

2,204,030

UNITED STATES PATENT OFFICE 2,204,030

TWIST DRILL AND LIKE METAL-CUTTING TOOLS

James Say, Hammersmith, London, England

Application July 22, 1937, Serial No. 155,116
In Great Britain August 1, 1936

2 Claims. (Cl. 77—67)

This invention relates to improvements in twist drills and like metal-cutting tools and has for its object to provide means whereby the metal chips removed by the drill or like tool are broken up during the process of cutting.

The improvement is more particularly applicable to spiral or straight fluted drills but can with advantage be applied to most types of boring tools where an advanced chip-breaker is preferred.

In applying the improvement to spiral or straight fluted drills, as an example, I provide on the cutting edge of the flute one or more projections according to the size of the drill, the projections running the full length of the flute. The projections or ribs may be milled at the same time as the flute of the drill is being produced, and may be of any preferred form, but convex or flat projections are preferred.

According to this invention the cutting sides of the flutes may have a plurality of projections or ribs of uniform size and shape on each flute, the ribs on each flute being symmetrical and of equal distance from the centre of the drill, but ribs or projections in different flutes may be formed at different distances from the centre of the drill or be formed of different formation or shape.

In the accompanying drawing—

Figure 1:
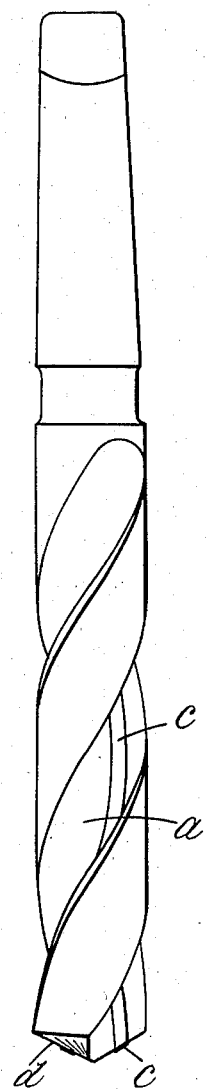
Figure 1 is a side view of a twist drill in accordance with this invention.
Figure 3:
Figure 3 is a side view of a straight fluted drill in accordance with this invention.

Referring to Figures 1, 2, 3 and 4, similar letters denote similar parts. As illustrated in the drawing, $a$ denotes the flutes of the drills, $b$ the cutting lips of the flutes $a$, and $c$ the projections or ribs formed on the cutting sides of the flutes and having the same pitch as the flutes.

Figure 5:
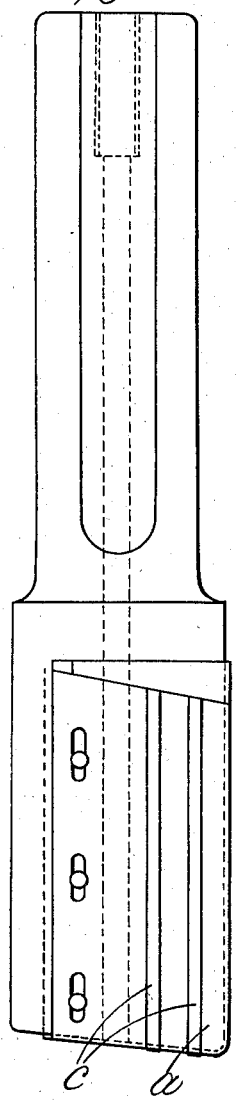
Figure 5 is a side view of a boring tool in accordance with this invention.
Figure 2:
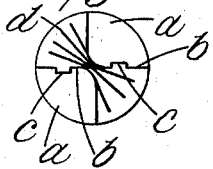
Figure 2 is an end view of the drill.
Figure 4:
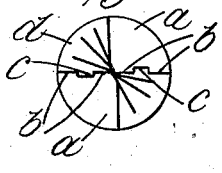
Figure 4 is an end view of this drill.
Figure 6:
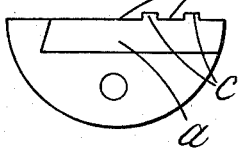
Figure 6 is an end view of this boring tool.

Figures 5 and 6 illustrate a boring tool similar to those generally used in the process of gun boring, wherein $a$ denotes a tool or cutter inserted in a holder or shank, $b$ the cutting lip of the tool $a$ and $c$ the projections or ribs formed on the cutting lip of the tool.

The backing off of clearance areas $d$ behind the cutting lips $b$ and shank clearances are formed in the usual way, and the projections $c$ being raised above the cutting lips $b$ are always in advance of the cutting lips should the drill or tool be reground, so that a permanent advanced chip-breaker is provided.

I claim:

1. In a drill including a land having at its lower end a cutting edge, a surface the plane of which is substantially radial to the curvature of said land, an elongate projection on the face of said surface extending longitudinally thereof, the walls of said projection being perpendicular to the face of the surface, the top of said projection being parallel with said face, the transverse width of said projection being greater than the height of said projection, one end of said elongate projection terminating in a cutting edge located in advance of, and above, the cutting edge on the land to provide a permanent advanced chip-breaker, and the other end of said projection terminating at the upper end of said surface.

2. In a drill, including a land and a groove, said land terminating at its lower end in a cutting edge, an elongate projection on the face of the groove extending longitudinally and inwardly thereof, the walls of said projection being perpendicular to the face of the groove, the top of said projection being parallel with said face, the transverse width of said projection being greater than the height of said projection, one end of said elongate projection terminating in a cutting edge located in advance of, and above, the cutting edge on the land to provide a a permanent advanced chip-breaker, and the other end of said projection terminating at the upper end of said surface.

JAMES SAY.